United States Patent [19]

Mayer

[11] 4,224,285
[45] Sep. 23, 1980

[54] SMOKE FILTER FOR INTERNAL COMBUSTION ENGINES

[75] Inventor: Edward A. Mayer, Newburgh, N.Y.

[73] Assignee: Texaco Inc., White Plains, N.Y.

[21] Appl. No.: 893,561

[22] Filed: Apr. 5, 1978

[51] Int. Cl.² .................. F01N 3/15; B01D 39/10
[52] U.S. Cl. .................... 422/179; 55/509; 55/DIG. 30; 422/177
[58] Field of Search .............. 422/171, 177, 179; 55/DIG. 30, 509

[56] References Cited

U.S. PATENT DOCUMENTS

| 3,094,394 | 6/1963 | Innes et al. | 422/179 X |
| 3,567,403 | 3/1971 | Perga | 422/179 |
| 3,775,064 | 11/1973 | Berger et al. | 422/179 X |
| 3,902,853 | 9/1975 | Marsee et al. | 422/171 |
| 3,945,803 | 3/1976 | Musall et al. | 422/179 |
| 4,004,887 | 1/1977 | Stormont | 422/179 |
| 4,039,294 | 8/1977 | Mayer et al. | 422/171 |

FOREIGN PATENT DOCUMENTS 2331434 1/1975 Fed. Rep. of Germany .......... 422/177

Primary Examiner—Joseph Scovronek
Attorney, Agent, or Firm—Carl G. Ries; Robert A. Kulason; Henry C. Dearborn

[57] ABSTRACT

A simple low cost smoke filter. It is adapted for use in an internal combustion engine exhaust system. It has a tapered body with a mass of alumina coated wire supported therein. The filter medium is under some longitudinal force created by a pervious support that has an unstressed curved configuration which is flattened against the medium. This is done in order to cause radial compression because of the taper, as well as longitudinal compression thereof.

2 Claims, 7 Drawing Figures

U.S. Patent  Sep. 23, 1980  4,224,285
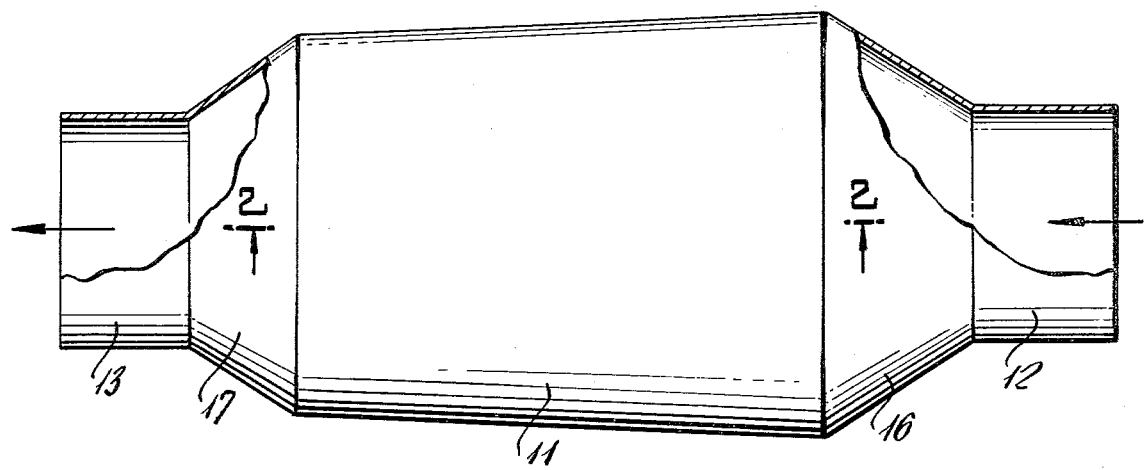
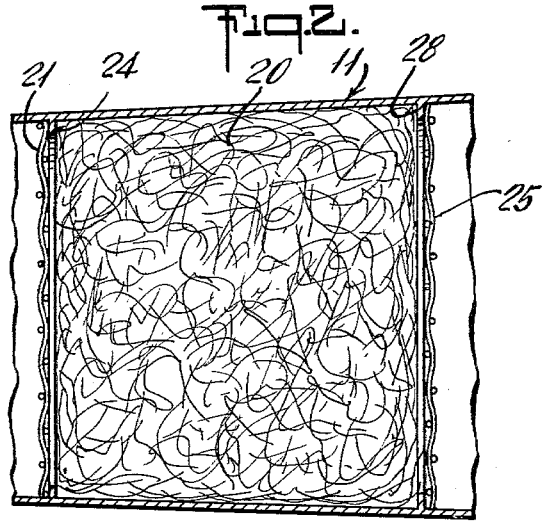 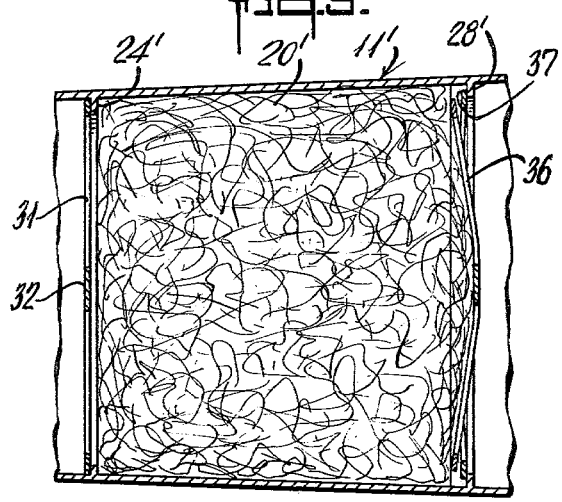
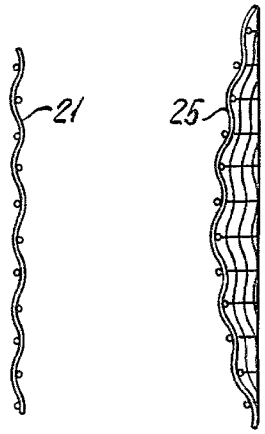 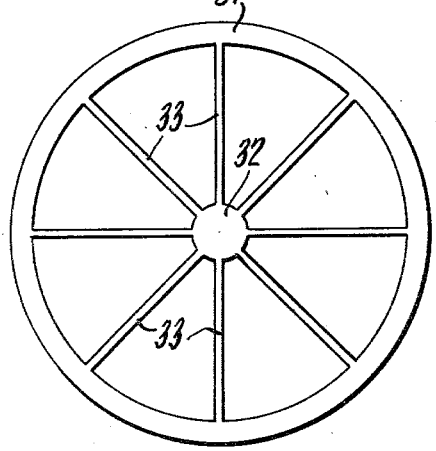 

SMOKE FILTER FOR INTERNAL COMBUSTION ENGINES

BACKGROUND OF THE INVENTION

1. Field of the Invention

This invention concerns a smoke filter in general, and more specifically relates to structure for a smoke filter especially adapted for use in an internal combustion engine exhaust system.

2. Description of the Prior Art

A very effective type of smoke filter has been found to be the catalytic type which employs alumina coated wire, such as steel wool or the like, as a substrate for the alumina. However, a key difficulty with such type of filter has been found to be the loss of resilience of the substrate material which occurred with exposure to high temperatures for extended periods of time. The grain growth of the wire, or steel wool, resulted in its becoming a brittle support structure for the alumina coating. And the coating does not add any strength of its own. Consequently, the mechanical vibrations and thermal gradients, which result in expansion and contraction of the substrate filter elements relative to one another, create difficulties in maintaining the physical shape such that it will maintain necessary resilience and so an adequate surface for contacting the hot exhaust gases without channeling.

Furthermore, while a recent U.S. Patent (which is assigned to the same assignee as this application) i.e. No. 4,039,294, shows structure for a similar filter, it is clearly a relatively expensive type of mechanical structure. Also, it does not suggest the use of a tapered housing, so that is is unable to obtain the additional benefits of having radial compressive force applied to the filter medium.

Consequently, it is an object of this invention to provide structure that is low cost and yet effective in overcoming difficulties heretofore encountered with the filter medium for a particular type of smoke filter.

SUMMARY OF THE INVENTION

Briefly, the invention concerns a smoke filter for use with the exhaust system of an internal combustion engine. It comprises a housing having inlet and outlet pipes coaxially attached thereto, and adapted for being connected into said exhaust system. It also comprises a mass of alumina coated wire filling said housing between said inlet and outlet pipes, and first pervious support means extending transversely across said housing adjacent to said outlet pipe for holding said mass of wire in place. It also comprises second pervious support means extending transversely across said housing adjacent to said inlet pipe for holding said mass of wire in place, and including means for maintaining a longitudinal compressive force against said mass of wire. The said housing is tapered between said first and said second support means for maintaining said mass of wire under compression radially inward toward the axis thereof.

Again briefly, the invention concerns a smoke filter for use with the exhaust system of an internal combustion engine. It comprises a tapered housing having inlet and outlet pipes coaxially attached thereto and adapted for being connected into said exhaust system, and a mass of alumina coated stainless steel wool filling said housing between said inlet and outlet pipes. It also comprises a first spoked wheel having a flat planar configuration and situated transversely across at the smaller end of said tapered housing, for holding said mass of steel wool in place, and a second spoked wheel having a maximum diameter less than the transverse dimension of the larger end of said tapered housing to permit longitudinal displacement toward said mass of steel wool. It also comprises a flange on the inside surface of said housing at the larger end thereof, and a convoluted spring located between said flange and the rim of said second spoked wheel for applying a longitudinal bias force against said mass of steel wool. The said tapered housing is circular in cross section and has a minimal degree of taper consistent with developing a radial compressive force on said mass of steel wool sufficient to eliminate channeling of exhaust gases.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 1 is a side elevation partly broken away in cross section, illustrating a filter housing according to the invention;

FIG. 2 is a shortened, partial, longitudinal cross section view taken along the lines 2—2 of FIG. 1;

FIG. 3 is a cross section view of the down-stream screening element prior to mounting on the body of the filter housing, as indicated in FIG. 2;

FIG. 4 is a cross section view of the other screening element prior to mounting on the body of the filter as shown in FIG. 2, and indicates its unstressed condition;

FIG. 5 is a partial longitudinal cross section somewhat reduced in length and showing a different modification as to the support elements to hold the filter medium in place;

FIG. 6 is a front elevation of one of the spoked wheel support elements illustrated in FIG. 5; and FIG. 7 is an end elevation of the other spoked wheel illustrated in FIG. 5.

DESCRIPTION OF THE PREFERRED EMBODIMENTS

Referring to FIGS. 1 thru 4, one modification of a smoke filter structure according to the invention will be described. It will be understood that a smoke filter according to this invention is particularly adapted for use with the exhaust system of an internal combustion engine. Thus, there is a housing 11 that is attached to an inlet pipe 12 and an outlet pipe 13 by any feasible structure such as the frusto-conical sections 16 and 17 respectively. These inlet and outlet pipes 12 and 13 will be designed for adapting the filter unit to be attached into the exhaust piping of an internal combustion engine.

With reference to FIG. 2, it will be understood that the illustration of the main body of the filter along with that portion of the housing structure is somewhat foreshortened longitudinally, for convenience of illustration. Filling the central or body portion of the housing 11, there is a mass of alumina coated wire 20, that is preferrably stainless steel wool which has been coated with alumina by any feasible procedure.

In order to support the mass of filter material 20 while holding it in place within the housing 11, there is a first pervious support element 21. It may take the form of screening, and it is attached to the housing 11 internally in any feasible manner. For example, the screen 21 may be spot welded to an internal flange 24. Also, it will be observed from the FIG. 3 illustration that the screen 21, in its unstressed condition has a flat planar configuration. It will be appreciated that instead of the element 21 being constructed of screening for supporting the filter material, it might be constructed of expanded metal if desired.

At the other end of the housing 11, near the end section 16, there is a second pervious support element 25 that is attached to the housing 11 in a similar manner as the screen element 21, i.e. by being welded or otherwise attached to an internal flange 28. However, this support element 25 is not attached in place until after the filter material, i.e. the coated steel wool 20 has been inserted in place within the housing 11. Then, because the support element 25 has an unstressed curved configuration, as indicated by the FIG. 4 illustration, it will apply a longitudinal pressure to the filter material 20 when it has been fastened in place against the flange 28. Here again, the support element 25 may be constructed of expanded metal instead of screening.

In addition, and of particular importance, it should be noted that the housing 11 is tapered from the inlet end toward the outlet end. This is clearly indicated in the drawings. It provides an important benefit in that when the longitudinal pressure is applied to the filter medium 20 by the end support element 25, as mounted in place, there is a radially directed compressive force on the filter material 20 because of the tapered shape of the housing 11. Both the longitudinal and radial force apply some pressure to the filter material 20 and so act to overcome the problem which has been found to exist in that the mechanical vibrations and thermal gradients encountered result in expansion and contraction of the parts so that the filter material becomes loosened and loses its resilience so as to allow exhaust gases to bypass it.

It will be understood that while the illustrations indicate the housing 11 to be circular in cross section, it is feasible to have other cross sectional shapes such as elliptical or the like. However, in any event, an important feature is to have the indicated taper of the housing diameter from the inlet toward the outlet end in order to provide the desired radial compressive force on the steel wool filter bed, as desired. The amount of such taper is desirably only a minimal degree of taper consistent with the resilience of the filter material 20 and the resilience of the longitudinal force (in end loading) which is provided by the spring 25 mentioned above, or otherwise.

FIGS. 5, 6 and 7 illustrate a modification of the elements for this invention and particularly those relating to the support elements for the filter material 20. Thus, the same elements will be given the same reference numbers but using a prime mark therewith. The housing 11' and filter material 20' are the same as already described in connection with the other modifications. In this modification the first support means is in the form of a spoked wheel 31 that has a hub 32 and spokes 33. As indicated in FIG. 5, the wheel 31 is attached to a flange 24' by being welded thereto, or otherwise securely attached around the rim of the wheel 31.

There is a similar spoked wheel 36 that is mounted at the other end of the body of filter material 20', as shown in FIG. 5. In this case, instead of having the wheel 36 attached to flange 28' inside of the housing 11', there is a convoluted spring 37 that is placed inside of the flange 28' and outside of the rim of the wheel 36. Consequently, this spring 37 applies pressure to the rim of the wheel 36 giving it a bias force longitudinally toward the filter material 20'. It will be understood that the diameter of the spoked wheel 36 is substantially the same as that of the wheel 31 in order to be sure that there is ample clearance inside of the housing 11' to permit free movement longitudinally toward the filter material 20'.

Here again, the action is similar in regard to the desired effect upon the filter material. It applies both longitudinal and radial pressure so as to overcome the tendency to become loosened and thus permit channeling and so loss of effectiveness of the filter action.

It will be appreciated that the structure of a smoke filter unit, according to this invention, is quite simple and consequently low cost in its construction. While particular embodiments of the invention have been described above in considerable detail, this is not to be taken as in any way limiting the invention but merely as being descriptive thereof.

I claim:

1. A smoke filter for use with the exhaust system of an internal combustion engine, comprising a tapered housing having inlet and outlet pipes coaxially attached thereto and adapted for being connected into said exhaust system, a mass of alumina coated stainless steel wool filling said housing between said inlet and outlet pipes, a first spoked wheel having a flat planar configuration and situated transversely across at the smaller end of said tapered housing adjacent to said outlet pipe for holding said mass of steel wool in place, a second spoked wheel having a maximum diameter less than the transverse dimension of the larger end of said tapered housing to permit longitudinal displacement toward said mass of steel wool, said second spoked wheel having an unstressed curved configuration, a flange on the inside surface of said housing at the larger end thereof, and a convoluted spring located between said flange and the rim of said second spoked wheel for applying a longitudinal bias force against said mass of steel wool, said tapered housing being circular in cross section and having a minimal degree of taper consistent with developing a radial compressive force on said mass of steel wool sufficient to eliminate channeling of exhaust gases.

2. A smoke filter according to claim 1, wherein said second spoked wheel has a maximum diameter substantially equal to that of said first spoked wheel.

* * * * *